United States Patent
Siedlecki

[11] Patent Number: 5,297,841
[45] Date of Patent: Mar. 29, 1994

[54] CARGO DOOR ASSEMBLY

[75] Inventor: Tadeusz J. Siedlecki, Dearborn, Mich.

[73] Assignee: Ford Motor Company, Dearborn, Mich.

[21] Appl. No.: 997,067

[22] Filed: Dec. 28, 1992

[51] Int. Cl.⁵ .............................................. B60J 5/04
[52] U.S. Cl. ................................... 296/146.6; 296/188
[58] Field of Search ............... 296/146 C, 146 B, 188, 296/202

[56] References Cited

U.S. PATENT DOCUMENTS

| | | |
|---|---|---|
| 2,679,420 | 5/1954 | Crockett, Jr. . |
| 3,035,863 | 5/1962 | Hottle . |
| 3,338,612 | 8/1967 | Howard . |
| 3,718,364 | 2/1973 | Fischer et al. ............... 296/189 |
| 3,776,588 | 12/1973 | Sobajima et al. . |
| 3,788,686 | 6/1971 | Rossie et al. . |
| 3,819,228 | 6/1974 | Cornacchia . |
| 3,944,278 | 3/1976 | Takahashi et al. . |
| 3,968,558 | 7/1976 | Sekine et al. . |
| 4,013,317 | 3/1977 | Reidelbach et al. ............ 296/146 C |
| 4,307,911 | 12/1981 | Pavlik . |
| 4,438,969 | 3/1984 | Kamijo et al. . |
| 4,462,633 | 7/1984 | Maeda . |
| 4,488,751 | 12/1984 | Kling ............................... 296/188 X |
| 4,747,629 | 5/1988 | Miller . |
| 4,917,433 | 4/1990 | Tomforde .................. 296/146 C X |
| 4,930,836 | 6/1990 | Grinn .......................... 296/183 X |
| 4,936,621 | 6/1990 | Shimoda et al. . |
| 5,137,325 | 8/1992 | Ohya ......................... 296/146 C X |

Primary Examiner—Joseph D. Pape
Attorney, Agent, or Firm—Daniel M. Stock; Roger L. May

[57] ABSTRACT

A cargo door assembly is provided for a van-type vehicle in which vertically spaced pairs of hook and catch plate engagements are carried at the interface between two mating doors and each of the sets of plates is reinforced in mounting within the doors. The hook of each pair is carried on one of the two doors and the catch is carried on the other. They form catch assemblies which are arranged to engage when the doors are closed to resist inward deflection of the doors.

10 Claims, 3 Drawing Sheets

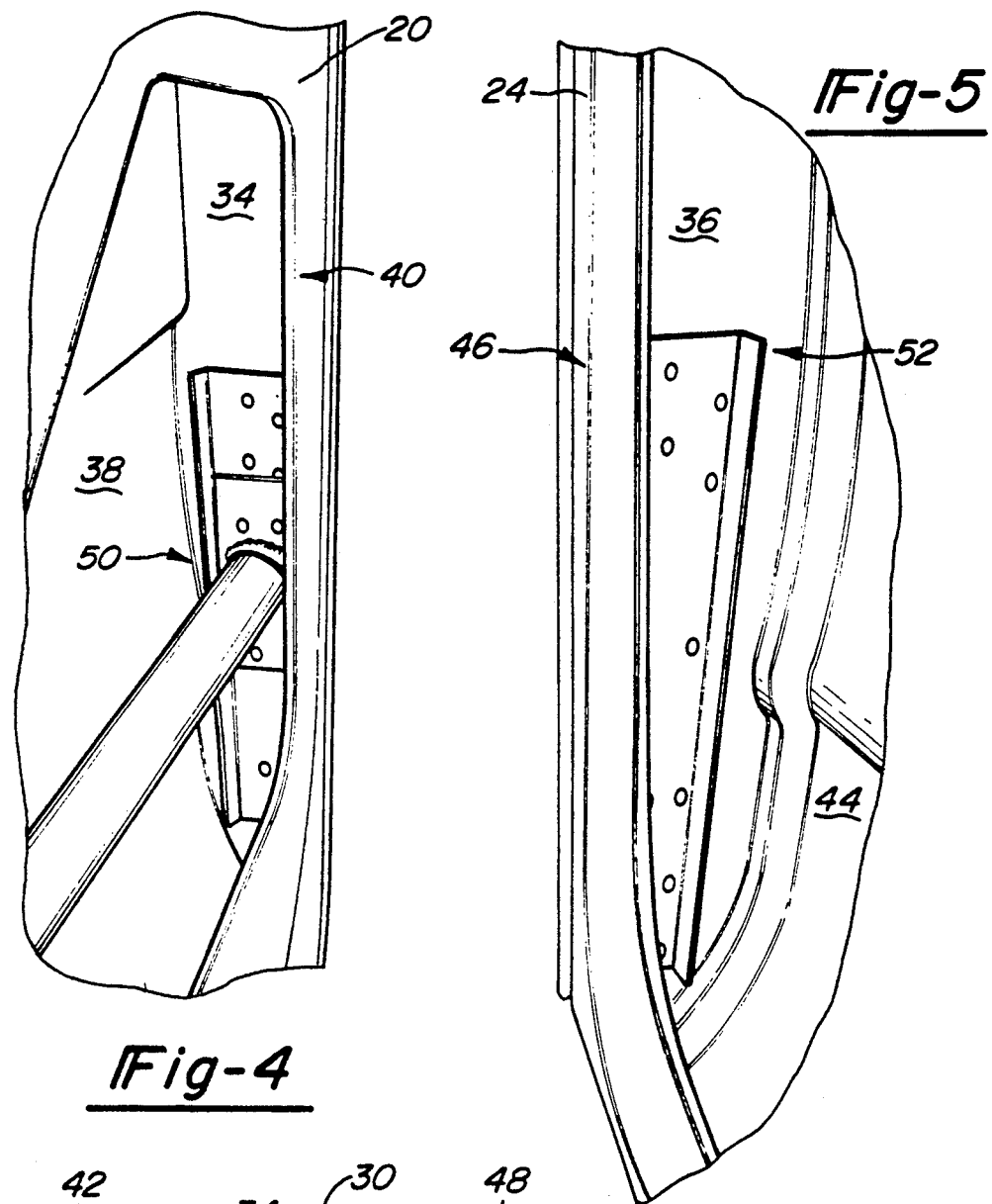
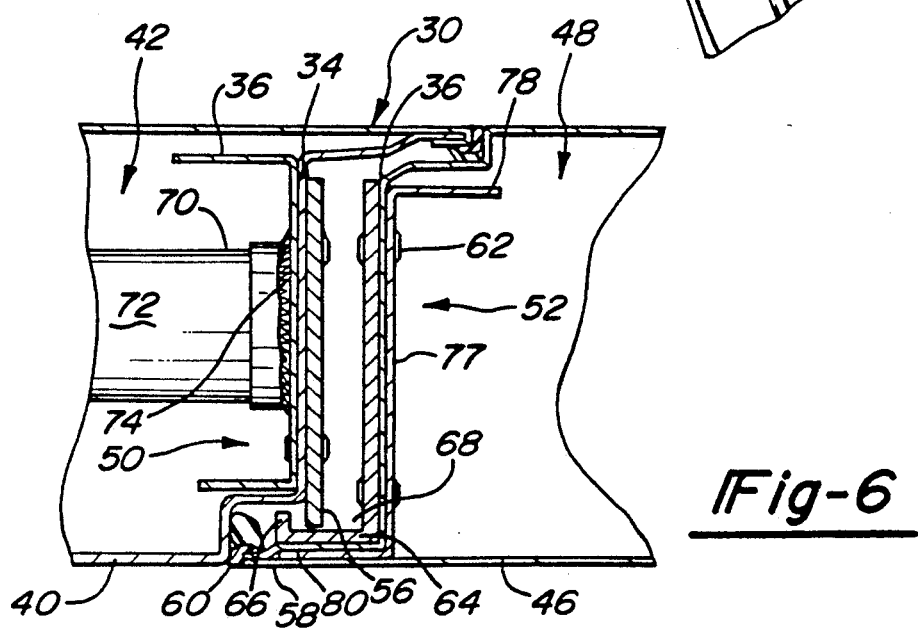

CARGO DOOR ASSEMBLY

BACKGROUND OF THE INVENTION

1. Field of the Invention

The present invention relates generally to vehicle doors and, more specifically, to vehicle doors arranged on the side of van-type vehicles.

2. Description of Related Art

In the manufacture and sale of automotive vehicles of the type generally referred to as "vans", it is customary to provide for ingress and egress to rear portions of the vehicle body through a rearwardly placed side door or doors positioned on at least one side of the vehicle. The doors come generally in two types: sliding doors and center opening, outwardly swinging cargo doors.

Continuing study into the resistance of the body structures of these van-type vehicles to the imposition of external forces has resulted in the establishment of certain design goals for enhancing the resistance of side vehicle structures to imposition of such loads.

It is known in the prior art to enhance the resistance of side impact of a vehicle door through the provision of special formations at top and bottom edges of the door such as is exemplified in U.S. Pat. No. 3,776,588 to Sobajima et al. It is also known to provide interengageable locking elements between a door and a vehicle body as exemplified in U.S. Pat. No. 3,819,228 to Cornacchia. Both of these exemplary teachings, however, require substantial modification of the adjacent vehicle body structure and, importantly, do not treat problems in the dynamics of deflection occasioned by the non-solid interface between the two doors of the set of cargo doors.

SUMMARY OF THE INVENTION

It is accordingly an object of the present invention to overcome the deficiencies of the prior art by providing a cargo door assembly that enhances the resistance to lateral loading on a pair of cargo doors without substantial modification of adjacent structure in the vehicle body.

This is accomplished in providing a cargo door assembly that includes a pair of longitudinally spaced cargo doors pivotally mounted for movement between open and closed positions in which means is provided for defining a pair of vertically spaced catch assemblies between the doors which is operative to resist movement of the doors laterally inwardly away from the closed position.

The cargo door assembly of the present invention advantageously provides an enhanced resistance to lateral deflection with a minimum outlay of cost and additional material.

BRIEF DESCRIPTION OF THE DRAWINGS

Other advantages and features will be apparent to those skilled in the automotive body arts upon reading the following description with reference to the accompanying drawings, in which:

FIG. 4 is a perspective view of the inside of the door of FIG. 2;

FIG. 5 is a perspective view of a portion of the inside of the door of FIG. 3;

FIG. 6 is a partial cross-sectional view of the interface between the pair of cargo doors in the closed position.

DESCRIPTION OF THE PREFERRED EMBODIMENT

Figure 1:
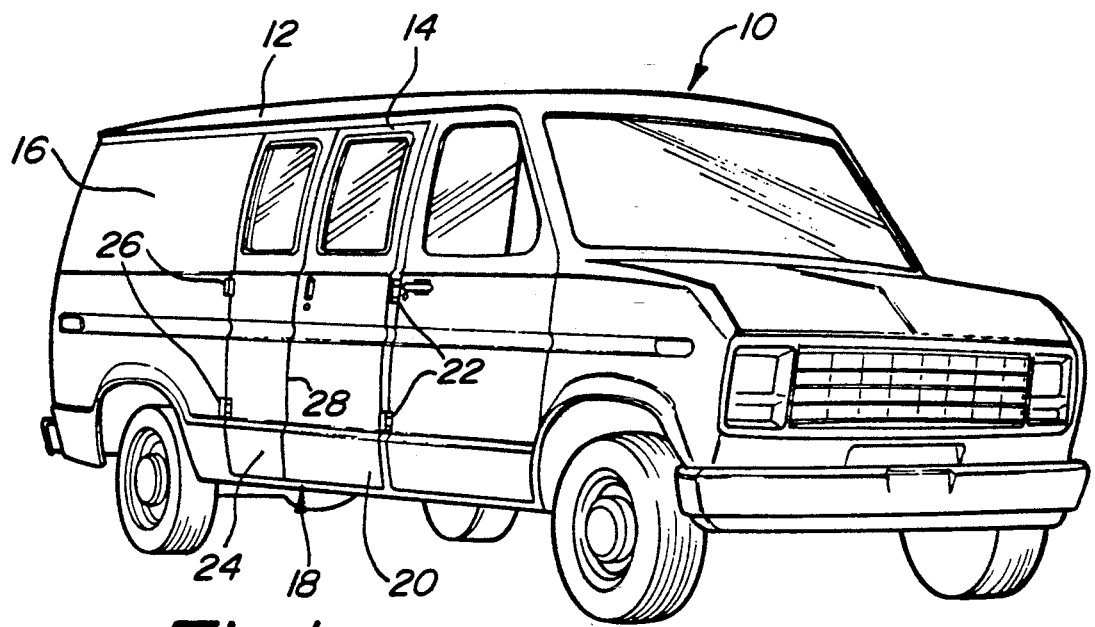
FIG. 1 is a perspective view of a van having a cargo door assembly according to the present invention.

Turning now to the drawings, and in particular to FIG. 1 thereof, a van indicated generally at 10 is illustrated as comprising a body 12 having an aperture 14 formed through its side 16, and a cargo door assembly indicated generally at 18 for closing the aperture 14. The cargo door assembly 18 is illustrated as being generally comprised of a first door 20 mounted through hinges indicated generally at 22 for movement about a vertical hinge axis between open and closed positions, and a second door 24 hingedly mounted on hinges 26 for movement about a second vertical hinge axis longitudinally displaced from the axis of the hinges 22. The first and second doors 20, 24 swing for movement between the closed position shown in FIG. 1 and open positions for providing access to rear portions of the van body 12. The doors 20, 24 are preferably held fast in their closed position by latch and lock mechanisms of conventional type which may be positioned for engagement between the interface indicated at 28 between the doors 20, 24 or at positions at the top and/or bottom of the aperture 14. Many combinations of latching and locking devices are possible and are well known to those skilled in the automotive body arts. Operation of the cargo door assembly of the present invention is independent of the choice of latching and locking mechanisms.

The enhanced resistance to lateral load of the cargo door assembly of the present invention is provided by a pair of vertically spaced catch assemblies, one of which is illustrated in cross-section in its closed position designated by the numeral 30 in FIG. 6.

Figure 2:
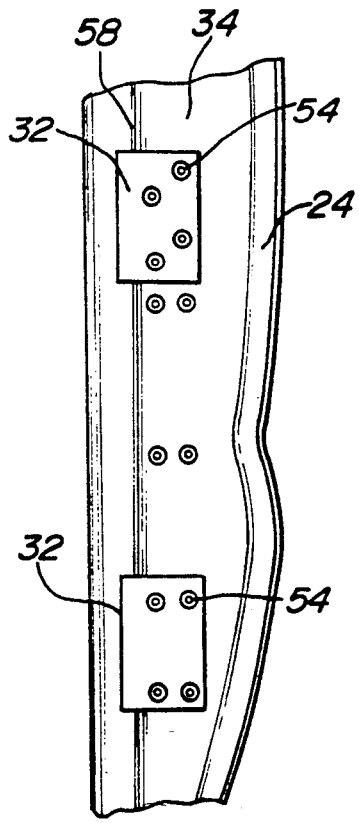
FIG. 2 is an end view of the free end of one of the two doors of the cargo door assembly.
Figure 3:
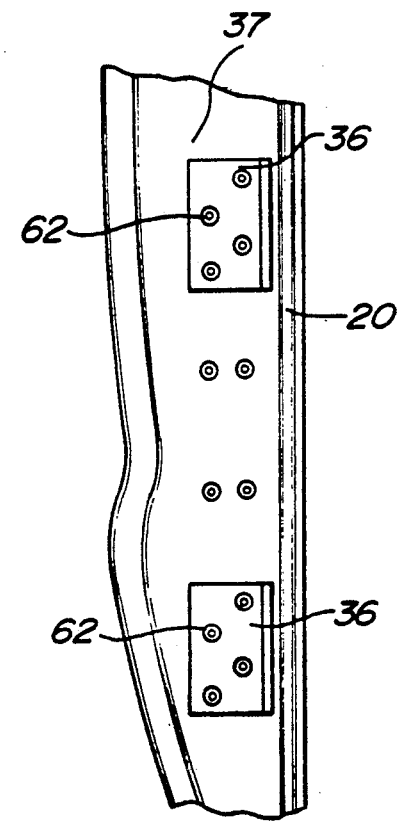
FIG. 3 is an end view of one face of the other door of the cargo door assembly.
Figure 7:
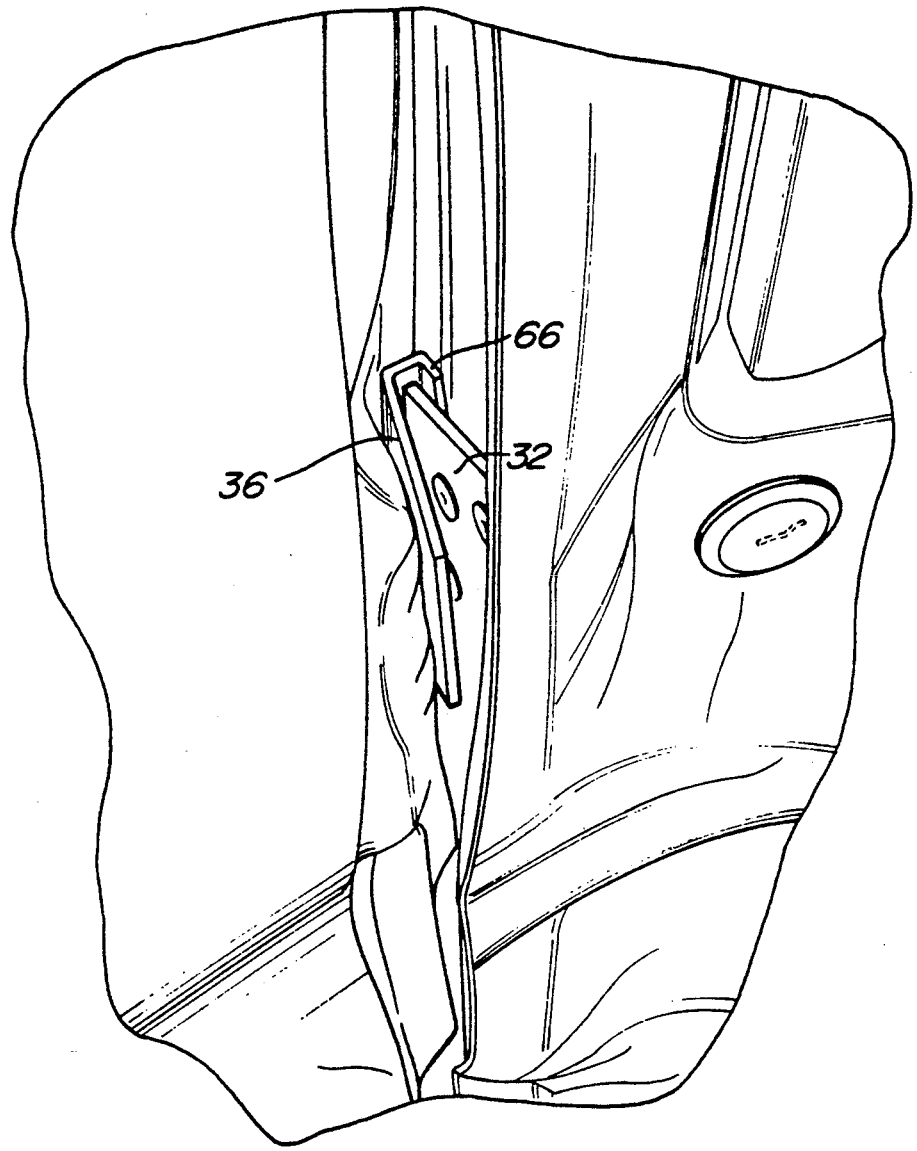
FIG. 7 is an inside view of the interface of cargo doors illustrating deflection after lateral loading.

As may be seen in FIGS. 2 and 3, each catch assembly 30 includes a catch plate 32 carried on a peripheral panel 34 of the door 24, and a hook plate 36 carried on a peripheral panel 37 of the door 20. The door 20 includes an outer panel 38 and an inner panel 40 defining a box section or cavity 42 therebetween, and the door 24 includes an outer panel 44 and an inner panel 46 defining a box section or cavity 48 therebetween. A reinforcement assembly 50 is carried in the box section 42 in registration with at least one of the catch plates 32 as may best be seen in FIG. 4. Preferably, both catch plates 32 would be mounted on reinforcement assemblies as shown at 50.

A second reinforcement assembly 52 is carried in the box section 48 for registration with the hook plates 36. Reinforcement assembly 52 preferably consists of an S-shaped plate extending vertically to encompass both hook plates 36, as may best be seen in FIGS. 5 and 6.

Each catch plate 32 consists of the generally rectangular, preferably steel plates secured as by weldments indicated generally at 54 to the peripheral panel 34 or free edge of the door 24. An edge portion 56 of the plate 32 projects inwardly from an inner surface 58 of the door 24. It will be noted that the rear edge 60 of inner panel 46 of door 20 overlies the inner surface 58 of inner panel 40 of the door 20.

Each hook plate 36 is secured as by weldments 62 to the peripheral panel 38 of the door 24 and includes a hook portion 64 having a retaining lip 66 positioned in juxtaposition with the inner surface 58 of inner panel 40 of door 20 and bounding a channel 68 receiving the edge portion 56 of the catch plates 32 with clearance.

As may best be seen in FIG. 6, reinforcement assemblies 50, 52 support the catch plates 32 and the hook plates 36, respectively, to define the catch assemblies 30. It should be understood that throughout the description where one cooperative interface between catch plate 32 and hook plate 36 is described and explained, according to the preferred embodiment, the vertically spaced pair indicated in FIGS. 2 and 3 is preferred and encompassed within that description.

Each reinforcement assembly 50 consists of a beam assembly 70 consisting of a beam 72 secured as by welding 74 at one end to the peripheral panel 34, and the other end to another peripheral panel (not shown) at the vertical axis of the hinges 22. A generally U-shaped brace member 76 may be interposed between beam 72 and the panel 34, as shown in FIG. 6.

Reinforcement assembly 52, which was previously described, preferably extends vertically to encompass hook plates 36 and is preferably configured as an S-shaped member to conform to the inner shape of cavity 48 as may best be seen in FIG. 6. It includes a base portion 77 fixed to the peripheral panel 34 of door 24 and further includes mutually perpendicularly extending flange portions 78, 80, the latter overlying the hook portion 64 of the hook plate 36.

In use with the van 10, with the doors 20, 24 in the closed position shown in FIGS. 1 and 6, the edge portion 56 of the catch plate 32 extends into the channel 68 of the hook plate 36 in spaced relationship with respect thereto. Upon imposition of the lateral load of the vehicle, that is, one projecting generally downwardly in FIG. 6, the catch plates 32, supported by reinforcement assemblies 50, may be driven downwardly into the channel 68, and as the doors 20, 24 tend to be pivoted inwardly about the vertical axes of hinges 22, 26, the edge portion 56 may displace leftwardly, as viewed in FIG. 6, towards the catch portion 66 of the hook portion 64, or its motion is constrained and the laterally imposed load is transferred longitudinal to the vehicle where tensile strength assists in its absorption.

While only one embodiment of the cargo door assembly of the present invention has been described, others would have heard of those skilled in the automotive vehicle art that do not depart from the scope of the following claims.

What is claimed is:

1. A cargo door assembly for closing an aperture in the side of a vehicle body, comprising:
   a first door hingedly connected to the vehicle body for movement about a first vertical hinge axis between an open position and a closed position;
   a second door hingedly connected to the vehicle body for movement about a second vertical hinge axis between an open position and a closed position, the first and second doors being adapted to be latchingly secured in the closed position; and
   means defining a pair of vertically spaced catch assemblies carried between the first and second doors and operative to resist movement of the doors laterally inwardly from the closed position with respect to the vehicle side.

2. A cargo door assembly as defined in claim 1, wherein the catch assembly defining means comprises:
   a pair of catch plates vertically spaced on an edge of one of the doors laterally spaced from the vertical hinge axis of that door; and
   a pair of hook plates vertically spaced on an edge of the other of the doors laterally spaced from the vertical hinge axis of that door and positioned to receive an edge portion of the catch plates when the doors are each in the closed position.

3. A cargo door assembly as defined in claim 1, wherein each of the doors has an inner panel and an outer panel laterally spaced therefrom and peripheral panels joining the inner and outer panels to define a box section, and further comprising separate reinforcement means carried within the box section of each of the doors positioned to support each of the catch assemblies and the catch assemblies.

4. A cargo door assembly as defined in claim 2, wherein each of the doors has an inner panel and an outer panel laterally spaced therefrom and peripheral panels joining the inner and outer panels to define a box section, and further comprising separate reinforcement means carried within the box section of each of the doors positioned to support each of the catch plates and the hook plates.

5. A cargo door assembly as defined in claim 3, wherein the reinforcement means in one of the doors comprises a generally S-shaped plate having side walls fixed to the door inner panel and a base wall fixed to the peripheral panel of the one door remote from the hinge axis of the door and a portion of the catch defining means is fixed to that peripheral panel in facing relationship with the base wall.

6. A cargo door assembly as defined in claim 4, wherein the reinforcement means in one of the doors comprises a generally S-shaped plate having side walls fixed to the door inner panel and a base wall fixed to the peripheral panel of the one door remote from the hinge axis of the door and a portion of the catch defining means is fixed to that peripheral panel in facing relationship with the base wall.

7. A cargo door assembly as defined in claim 5, wherein the S-shaped plate is weldingly secured to the door.

8. A cargo door assembly as defined in claim 2, wherein the hook plates each include a generally U-shaped hook portion and the catch plate edge portion is received within the hook portion when both doors are in the closed position.

9. A cargo door assembly as defined in claim 8, wherein the catch plated edge portion is spaced from the hook plate surface defining a channel when both doors are in the closed position.

10. A cargo door assembly for closing an aperture in the side of a vehicle body, comprising:
   a first door hingedly connected to the vehicle body for movement about a first vertical hinge axis between an open position and a closed position;
   a second door hingedly connected to the vehicle body for movement about a second vertical hinge axis between an open position and a closed position, the first and second doors being adapted to be latchingly secured in the closed position;
   means defining a pair of vertically spaced catch assemblies carried between the first and second doors and operative to resist movement of the doors laterally inwardly from the closed position with respect to the vehicle side; and
   reinforcing means carried within each of the doors in registration with portions of the catch defining means carried on each of the doors.

* * * * *